United States Patent
Seo et al.

(10) Patent No.: US 8,643,949 B2
(45) Date of Patent: Feb. 4, 2014

(54) POLARIZATION CONVERSION APPARATUS

(75) Inventors: Eunsung Seo, Seoul (KR); Seungman Jeong, Seoul (KR); Hyunho Choi, Seoul (KR); Sanghun Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 282 days.

(21) Appl. No.: 13/080,141

(22) Filed: Apr. 5, 2011

(65) Prior Publication Data

US 2011/0242656 A1    Oct. 6, 2011

(30) Foreign Application Priority Data

Apr. 5, 2010    (KR) .................. 10-2010-0030840

(51) Int. Cl.
*G02B 27/28* (2006.01)

(52) U.S. Cl.
CPC .................. *G02B 27/283* (2013.01)
USPC .................. 359/489.08

(58) Field of Classification Search
None
See application file for complete search history.

(56) References Cited

U.S. PATENT DOCUMENTS 6,478,429 B1 * 11/2002 Aritake et al. .................. 353/31
7,075,615 B2 * 7/2006 Ishihara et al. ............... 349/201

FOREIGN PATENT DOCUMENTS

JP    2003-121640 A    4/2003
KR    10-2001-0031135 A    4/2001

OTHER PUBLICATIONS

Office Action dated Sep. 29, 2011 in Korean Application No. 10-2010-0030840, filed Apr. 5, 2010.

* cited by examiner

*Primary Examiner* — Derek S Chapel
(74) *Attorney, Agent, or Firm* — Saliwanchik, Lloyd & Eisenschenk

(57) ABSTRACT

Disclosed is a polarization conversion apparatus, the apparatus including a first optical device capable of angle-converting incident unpolarized light to allow a polarization direction to be emitted in mutually different first and second linear polarizations, an FEL (Fly Eye Lens) including first and second MLAs (Micro Lens Arrays) arrayed with first and second micro lenses, where first and second linear polarizations of the first optical device incident on the first micro lenses are divided and condensed on an upper side and a bottom side of the second micro lenses of the second MLA, and a second optical device converting the first and second linear polarizations condensed on the upper side or the bottom side of the second MLA at the FEL to any one polarization of the first and second linear polarizations and emitting the polarization.

17 Claims, 5 Drawing Sheets

POLARIZATION CONVERSION APPARATUS

CROSS-REFERENCE TO RELATED APPLICATION

This application claims the benefit under 35 U.S.C. §119 of Korean Patent Application No. 10-2010-0030840, filed Apr. 5, 2010, which is hereby incorporated by reference in its entirety.

BACKGROUND OF THE DISCLOSURE

1. Field of the Invention

Exemplary embodiments of the present disclosure may relate to a polarization conversion apparatus configured to convert unpolarized light to polarization.

2. Description of Related Art

Projection optical systems including projectors and projection systems using an LCD (Liquid Crystal Display) panel and an LCOS (Liquid-Crystal-On-Silicon) micro display require polarized light due to an operational principle of LCD panel and LCOS micro-display itself.

Due to the fact that the general light source produces unpolarized light, the projection optical systems such as projectors and projection systems using an LCD panel and an LCOS micro-display need an optical device capable of producing polarized light. As one of simple methods producing the polarized light from these light sources, there is provided a method of using a polarization plate. However, it should be noted that, although the polarization having passed the polarization plate can be used, the polarization perpendicular to the transmittive polarization is absorbed or lost due to reflection. Therefore, this type of method generates a 50% light loss.

As a result, attempts have been made to overcome these disadvantages by developing polarization conversion devices capable of re-using the polarization that is wasted in the projection optical systems using the LCD panel and LCOS micro-display. Therefore, so-called polarization conversion apparatus can be used to overcome efficiency losses that would otherwise arise from the use of un-polarized light sources in systems requiring polarized illumination.

BRIEF SUMMARY

The present disclosure is directed to solving the above-mentioned disadvantages by converting unpolarized light to polarization.

Technical subjects to be solved by the present disclosure are not restricted to the above-mentioned description, and any other technical problems not mentioned so far will be clearly appreciated from the following description by the skilled in the art.

In one general aspect of the present disclosure, there is provided a polarization conversion apparatus, the apparatus comprising: a first optical device capable of angle-converting incident unpolarized light to allow a polarization direction to be emitted in mutually different first and second linear polarizations; an FEL (Fly Eye Lens) including first and second MLAs (Micro Lens Arrays) arrayed with first and second micro lenses, where first and second linear polarizations of the first optical device incident on the first micro lenses are divided and condensed on an upper side and a bottom side of the second micro lenses of the second MLA; and a second optical device converting the first and second linear polarizations condensed on the upper side or the bottom side of the second MLA at the FEL to any one polarization of the first and second linear polarizations and emitting the polarization.

Preferably, the first optical device includes an angle conversion passive element separating the incident unpolarized light to angle-converted right-circular polarization and left-circular polarization, and emitting the angle-converted right-circular polarization and left-circular polarization, and an optical conversion element converting the angle-converted right-circular polarization and left-circular polarization converted by the angle conversion passive element to first and second linear polarizations and emitting the first and second linear polarizations.

Preferably, the angle conversion passive element is a hologram element.

Preferably, the optical conversion element is a ¼ wave plate.

Preferably, the angle conversion passive element is contacted by the optical conversion element.

Preferably, the optical conversion element is opposite to the first micro lenses.

Preferably, the first linear polarization is condensed on each upper side of the second micro lenses of the second MLA at the second FEL, and the second linear polarization is condensed on each bottom side of the second micro lenses of the second MLA at the second FEL.

Preferably, the first linear polarization condensed on each upper side of the second micro lenses of the second MLA at the second FEL is converted and emitted to the second linear polarization by the second optical element, and the second linear polarization condensed on each bottom side of the second micro lenses of the second MLA at the second FEL passes the second optical element without being converted.

Preferably, the second optical device includes a ½ wave plate pattern having an optical axis at a 45-degree angle of the first linear polarization or the second linear polarization, and a transparent substrate formed with the ½ wave plate pattern.

Preferably, the ½ wave plate pattern is interposed between the transparent substrate and the FEL.

Preferably, the ½ wave plate pattern is opposite to the first micro lenses.

Preferably, the first linear polarization or the second linear polarization is converted to linear polarization whose polarization direction is mutually orthogonal at the ½ wave plate pattern, and the first linear polarization or the second linear polarization passes at a transparent substrate where ½ plate wave pattern is not formed.

Preferably, the ½ wave plate pattern is a stripe pattern.

Preferably, each width and gap of the stripe pattern is ½ the size of each micro lenses of the second MLA.

Preferably, the first and second MLAs are arranged in a matrix shape where the plurality of micro lenses is arranged in rows and columns.

Preferably, the ½ wave plate pattern is a stripe pattern formed in a column direction of the micro lenses at the MLA.

Preferably, the ½ wave plate pattern is a stripe pattern formed in a row direction of the micro lenses at the MLA.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

ADVANTAGEOUS EFFECTS

The polarization conversion apparatus according to the present disclosure has an advantageous effect in that the unpolarized light incident on the polarization conversion apparatus according to the present disclosure can be converted to first and second linear polarizations and emitted.

The polarization conversion apparatus according to the present disclosure has an advantageous effect in that the apparatus can be mounted and effectively used on an optical system that requires a single polarization.

The polarization conversion apparatus according to the present disclosure has an advantageous effect in that incident unpolarized light can be converted to a single polarization without any loss to thereby increase an amount of light.

BRIEF DESCRIPTION OF THE DRAWINGS

Accompanying drawings are included to provide a further understanding of arrangements and embodiments of the present disclosure and are incorporated in and constitute a part of this application. In the following drawings, like reference numerals refer to like elements and wherein.

Figure 1:
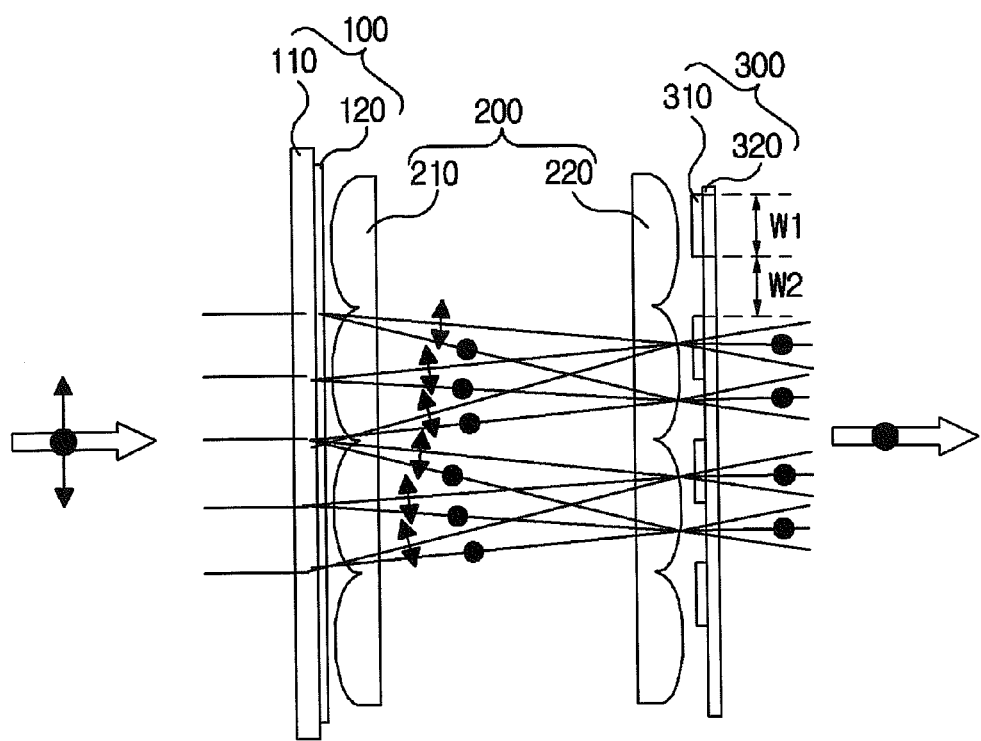
FIG. 1 is a schematic view of a polarization conversion apparatus according to the present disclosure.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. Acronyms are used extensively throughout the description to avoid excessively long descriptive phrases. The meaning will be clear from the context of the description.

FIG. 1 is a schematic view of a polarization conversion apparatus according to the present disclosure.

The polarization conversion apparatus according to the present disclosure comprises: a first optical device (100) capable of angle-converting incident unpolarized light to allow a polarization direction to be emitted in mutually different first and second linear polarizations; an FEL (Fly Eye Lens. 200) including first and second MLAs (Micro Lens Arrays. 210, 220) arrayed with first and second micro lenses, where first and second linear polarizations of the first optical device incident on the first micro lenses are divided and condensed on an upper side and a bottom side of the second micro lenses of the second MLA (220); and a second optical device (300) converting the first and second linear polarizations condensed on the upper side or the bottom side of the second MLA at the FEL to any one polarization of the first and second linear polarizations and emitting the polarization.

In the polarization conversion apparatus, in a case unpolarized light is incident on the first optical device (100), the first optical device (100) angle-converts the first and second linear polarizations each perpendicular to the other, and emits the polarizations.

That is, as shown in FIG. 1, the first optical device (100) may include an angle conversion passive element (110) separating the incident unpolarized light to angle-converted right-circular polarization and left-circular polarization, and emitting the angle-converted right-circular polarization and left-circular polarization, and an optical conversion element (120) converting the angle-converted right-circular polarization and left-circular polarization converted by the angle conversion passive element to first and second linear polarizations and emitting the first and second linear polarizations.

The angle conversion passive element and the optical conversion element can be contacted, where the optical conversion element may be interposed between the angle conversion passive element and the FEL, the optical conversion element may be arranged opposite to the first micro lenses, and the angle conversion passive element may be realized by a hologram element.

Thereafter, the first and second linear polarizations converted by the first optical element (100) is incident on the first micro lenses of the first MLA (210) at the FEL (200), and the first MLA (210) divisively condenses the first and second linear polarizations on an upper side and a bottom side of the second micro lenses of the second MLA (220).

Successively, the second optical device (300) converts the first and second linear polarizations condensed on the upper side or the bottom side of the second MLA at the FEL to any one polarization of the first and second linear polarizations and emits the polarization.

That is, the polarization conversion apparatus according to the present disclosure divides the unpolarized light that has passed the first optical device (100) to the first and linear polarization and the second linear polarization.

Now, the first linear polarization angle-converted by the first optical device (100) passes the FEL (200) to be condensed on the upper side of the second micro lenses of the second MLA (220) of the FEL (200), and the second linear polarization angle-converted by the first optical device (100) is condensed on the bottom side of the second micro lenses of the second MLA (220) of the FEL (200).

The first linear polarization condensed on the upper side of the second micro lenses of the second MLA (220) of the FEL (200) is converted to the second linear polarization by the second optical device (300) and emitted, and the second linear polarization condensed on the bottom side of the second micro lenses of the second MLA (220) of the FEL (200) passes the second optical device (300), whereby the second linear polarization is emitted from the second optical device (300).

At this time, the second optical device (300) allows the first linear polarization condensed on the upper side of the second micro lenses of the second MLA (220) of the FEL (200) to pass, and the second linear polarization condensed on the bottom side of the second micro lenses of the second MLA (220) of the FEL (200) to be converted to by the second optical device (300) and emitted.

Therefore, the unpolarized light incident on the polarization conversion apparatus according to the present disclosure can be advantageously converted to the first or second linear polarization. Another advantage is that the polarization conversion apparatus according to the present disclosure can be mounted on an optical system that requires a single polarization for effective use. Still another advantage is that the polarization conversion apparatus according to the present disclosure can convert all the single polarizations without any loss to thereby increase the amount of light.

Meanwhile, the second optical device (300) may include a ½ wave plate pattern (310) having an optical axis at a 45-degree angle of the first linear polarization or the second linear polarization, and a transparent substrate (320) formed with the ½ wave plate pattern (310). The first linear polarization or the second linear polarization is converted to mutually-orthogonal linear orthogonal to polarization direction by the ½ wave plate pattern, and the first linear polarization or the second linear polarization passes through by the transparent substrate (320) on which the ½ wave plate pattern is not formed.

Preferably, the ½ wave plate pattern (310) is realized by a stripe pattern. Furthermore, the ½ wave plate pattern may be interposed between the transparent substrate and the FEL, and the ½ wave plate pattern may be arranged opposite to the first micro lenses.

Still furthermore, each width (W1) and gap (W2) of the ½ wave plate pattern (310) which is a stripe pattern may be ½ the size of each micro lenses of the second MLA. The foregoing optical element converts the unpolarized light to polarization, where the polarization is an linear polarization, for example.

Figure 2A:
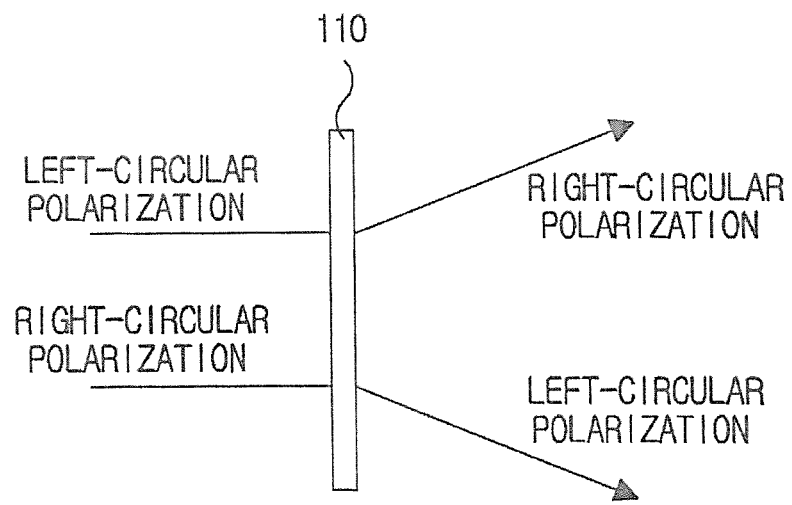
FIGS. 2a and 2b are schematic conceptual views illustrating functions of angle conversion passive element at a polarization conversion apparatus according to the present disclosure.
Figure 2B:
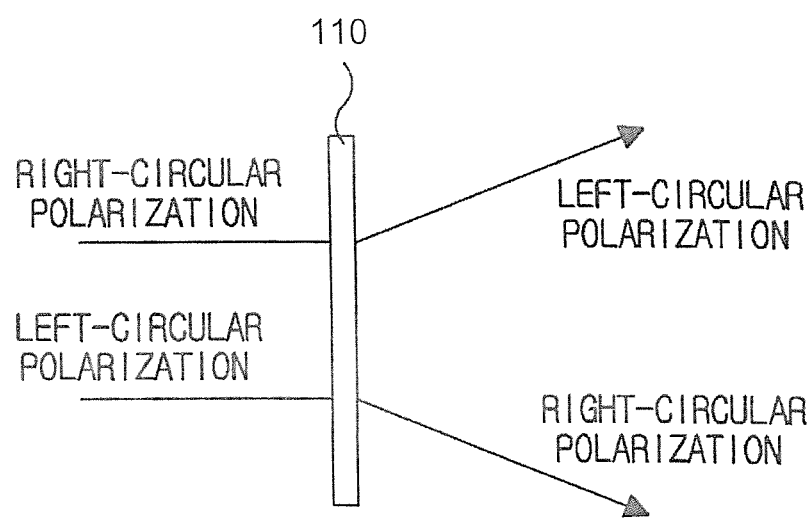

FIGS. 2a and 2b are schematic conceptual views illustrating functions of angle conversion passive element at a polarization conversion apparatus according to the present disclosure.

As noted above, the first optical device of the polarization conversion apparatus functions to angle-convert the incident unpolarized light to divide to the first linear polarization and the second linear polarization whose polarization direction is mutually orthogonal and emits the first and second linear polarizations.

At this time, the first optical device (100) may include an angle conversion passive element (110) separating the incident unpolarized light to angle-converted right-circular polarization and left-circular polarization. The angle conversion passive element (110) may select one of the two functions.

That is, as shown in FIG. 2a, the left-circular polarization is converted to right-circular polarization, with a predetermined angle folded upward, and emitted, and the right-circular polarization is converted to left-circular polarization, with a predetermined angle folded upward, and emitted.

Referring to FIG. 2b, the right-circular polarization is converted to left-circular polarization, with a predetermined angle folded upward, and emitted, and the left-circular polarization is converted to right-circular polarization, with a predetermined angle folded downward, and emitted. Therefore, in a case unpolarized light is incident on the angle-conversion passive element (110), the unpolarized light is divided into right-circular polarization and left-circular polarization, angle-converted and emitted.

Figure 3:
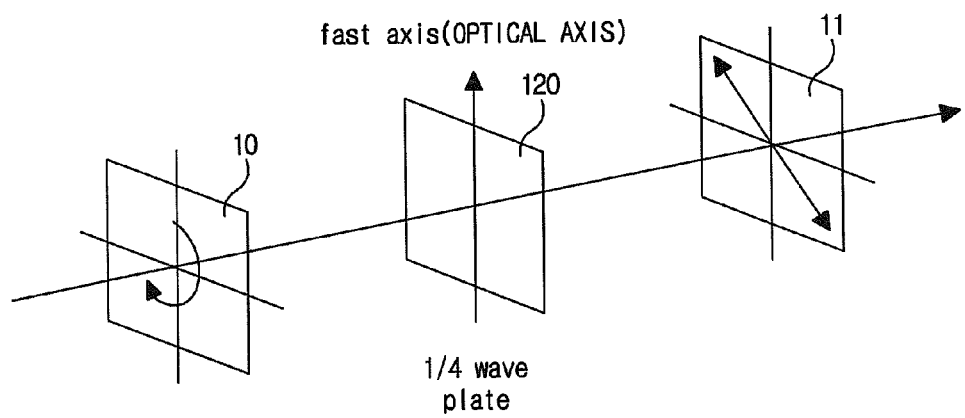
FIG. 3 is a schematic conceptual view illustrating functions of angle conversion passive element at a polarization conversion apparatus according to the present disclosure.
Figure 4:
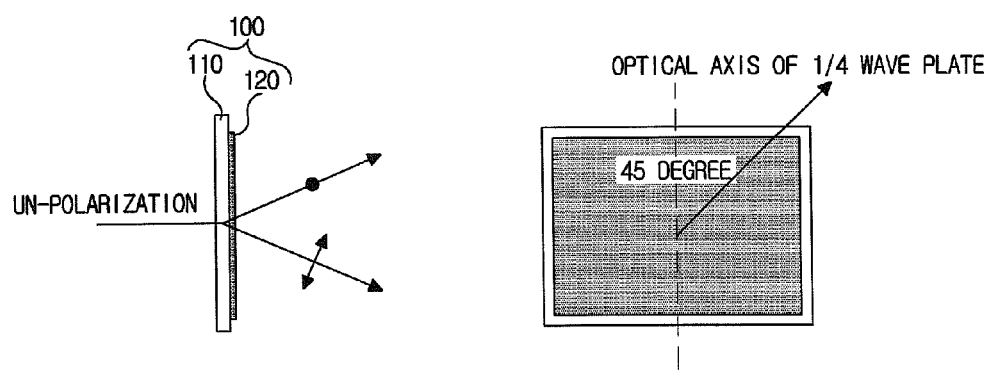
FIG. 4 is a schematic conceptual view illustrating a state where unpolarized light is divided into first and second linear polarizations from a first optical device of a polarization conversion apparatus according to the present disclosure which are then emitted.

FIG. 3 is a schematic conceptual view illustrating functions of angle conversion passive element at a polarization conversion apparatus according to the present disclosure, and FIG. 4 is a schematic conceptual view illustrating a state where unpolarized light is divided into first and second linear polarizations from a first optical device of a polarization conversion apparatus according to the present disclosure which are then emitted.

The optical conversion element (120) of the first optical element converts the right-circular polarization and left-circular polarization divided by the angle-conversion passive element to first and second linear polarizations whose polarization directions are mutually perpendicular, and emits same. Preferably, the optical conversion element (120) is a ¼ wave plate.

The ¼ wave plate converts the right-circular polarization or the left-circular polarization (10) to an linear polarization (11) inclined at 45 degrees relative to an optical axis, and emits same. Therefore, the right-circular polarization and left-circular polarization having passed the ¼ wave plate are converted to first and second linear polarizations whose polarization directions are mutually perpendicular, and emitted.

Consequently, as shown in FIG. 4, unpolarized light incident on the first optical element (100) is divided to the right-circular polarization and left-circular polarization by the angle-conversion passive element (110), and the right-circular polarization and left-circular polarization divided by the angle-conversion passive element (110) are converted to first and second linear polarizations whose polarization directions are mutually perpendicular, and emitted.

Figure 5:
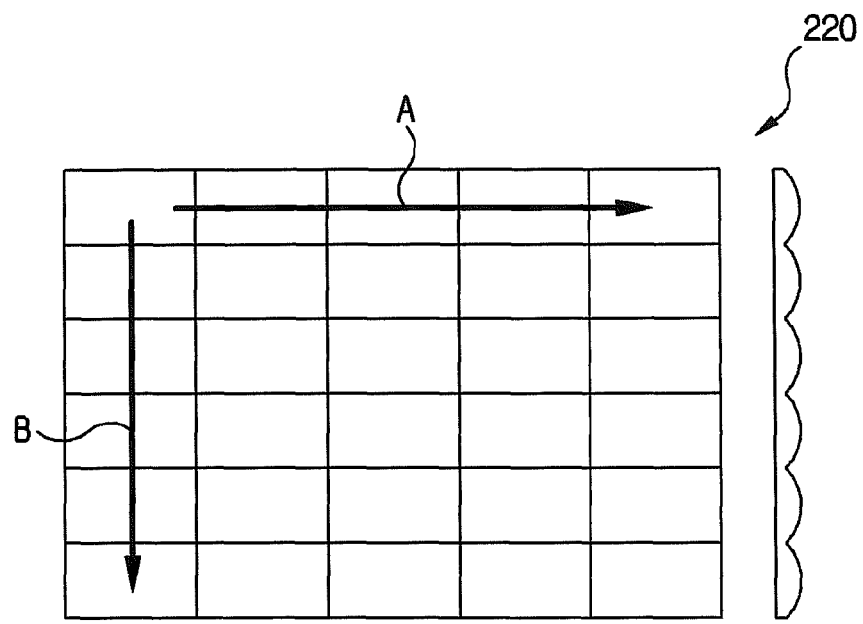
FIG. 5 is a schematic plan and cross-sectional view illustrating MLA of FEL of a polarization conversion apparatus according to the present disclosure.

FIG. 5 is a schematic plan and cross-sectional view illustrating MLA of FEL of a polarization conversion apparatus according to the present disclosure.

The MLA of FEL is such that a plurality of micro lenses is arranged in a matrix shape of rows and columns. As illustrated in FIG. 5, the second MLA (220) is formed with a plurality of square micro lenses in a row (A) direction and a column (B) direction, and each of the plurality of micro lenses takes the shape of a lens shape crosswise.

Figure 6A:
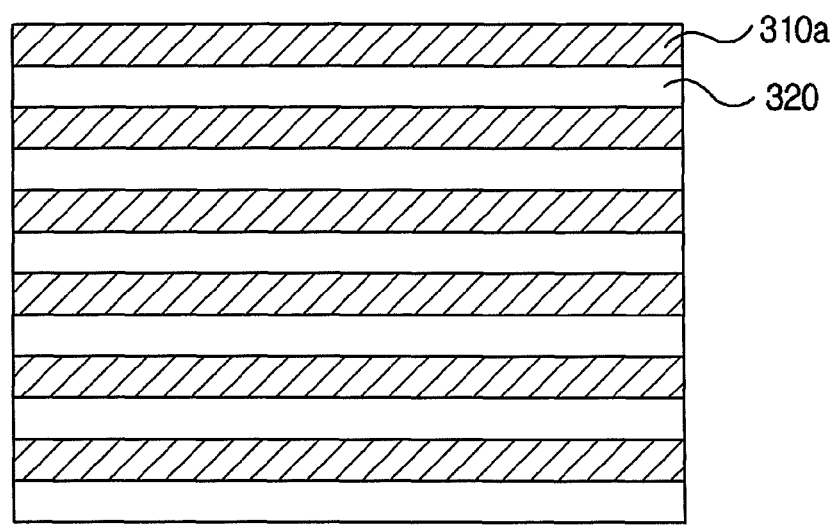
FIGS. 6a and 6b are schematic plan views illustrating an example of a ½ wave plate of a second optical device of a polarization conversion apparatus according to the present disclosure.
Figure 6B:
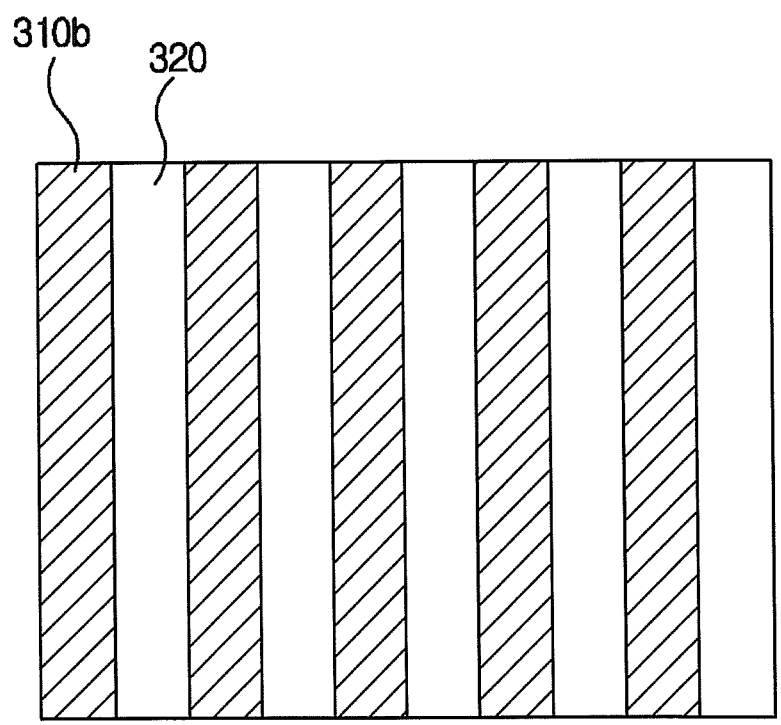

FIGS. 6a and 6b are schematic plan views illustrating an example of a ½ wave plate of a second optical device of a polarization conversion apparatus according to the present disclosure.

The second optical device includes a ½ wave plate pattern having an optical axis at a 45-degree angle of the first linear polarization or the second linear polarization, and a transparent substrate formed with the ½ wave plate pattern. Preferably, the ½ wave plate pattern is a stripe pattern formed on the transparent substrate (320). At this time, the ½ wave plate pattern may be a stripe pattern '310a' as illustrated in FIG. 6a formed with micro lenses of MLA in column direction. Furthermore, the ½ wave plate pattern may be a stripe pattern '310b' as illustrated in FIG. 6b formed with micro lenses of MLA in column direction.

The polarization conversion apparatus according to the present disclosure has an industrial applicability in that the unpolarized light incident on the polarization conversion apparatus according to the present disclosure can be converted to first and second linear polarizations and emitted, the apparatus can be mounted and effectively used on an optical system that requires a single polarization, and incident unpolarized light can be converted to a single polarization without any loss to thereby increase an amount of light.

The present disclosure should not be considered limited to the particular examples described above, but rather should be understood to cover all aspects of the disclosure as fairly set out in the attached claims. Various modifications, equivalent processes, as well as numerous structures to which the present disclosure may be applicable will be readily apparent to those of skill in the art to which the present disclosure is directed upon review of the instant specification.

What is claimed is:

1. A polarization conversion apparatus, the apparatus comprising:
    a first optical device capable of angle-converting incident unpolarized light to allow a polarization direction to be emitted in mutually different first and second linear polarizations;
    an FEL (Fly Eye Lens) including first and second MLAs (Micro Lens Arrays) arrayed with first and second micro lenses, where first and second linear polarizations of the first optical device incident on the first micro lenses are divided and condensed on an upper side and a bottom side of the second micro lenses of the second MLA; and
    a second optical device converting the first and second linear polarizations condensed on the upper side or the bottom side of the second MLA at the FEL to any one polarization of the first and second linear polarizations and emitting the polarization;
    wherein the first optical device includes an angle conversion passive element separating the incident unpolarized light to angle-converted right-circular polarization and left-circular polarization and emitting the angle-converted right-circular polarization and left-circular polarization, and an optical conversion element converting the angle-converted right-circular polarization and left-circular polarization converted by the angle conversion passive element to first and second linear polarizations and emitting the first and second linear polarizations.

2. The apparatus of claim 1, wherein the angle conversion passive element is a hologram element.

3. The apparatus of claim 1, wherein the optical conversion element is a ¼ wave plate.

4. The apparatus of claim 1, wherein the angle conversion passive element is contacted by the optical conversion element.

5. The apparatus of claim 1, wherein the optical conversion element is interposed between the angle conversion passive element and the FEL.

6. The apparatus of claim 5, wherein the optical conversion element is opposite to the first micro lenses.

7. The apparatus of claim 1, wherein the first linear polarization is condensed on each upper side of the second micro lenses of the second MLA at the second FEL, and the second linear polarization is condensed on each bottom side of the second micro lenses of the second MLA at the second FEL.

8. The apparatus of claim 7, wherein the first linear polarization condensed on each upper side of the second micro lenses of the second MLA at the second FEL is converted and emitted to the second linear polarization by the second optical element, and the second linear polarization condensed on each bottom side of the second micro lenses of the second MLA at the second FEL passes the second optical element without being converted.

9. The apparatus of claim 1, wherein the second optical device includes a ½ wave plate pattern having an optical axis at a 45-degree angle of the first linear polarization or the second linear polarization, and a transparent substrate formed with the ½ wave plate pattern.

10. The apparatus of claim 9, wherein the ½ wave plate pattern is interposed between the transparent substrate and the FEL.

11. The apparatus of claim 9, wherein the ½ wave plate pattern is opposite to the first micro lenses.

12. The apparatus of claim 9, wherein the first linear polarization or the second linear polarization is converted to linear polarization whose polarization direction is mutually orthogonal at the ½ wave plate pattern, and the first linear polarization or the second linear polarization passes at a transparent substrate where ½ plate wave pattern is not formed.

13. The apparatus of claim 9, wherein the ½ wave plate pattern is a stripe pattern.

14. The apparatus of claim 13, wherein each width and gap of the stripe pattern is ½ the size of each micro lens of the second MLA.

15. The apparatus of claim 1, wherein the first and second MLAs are arranged in a matrix shape where the plurality of micro lenses is arranged in rows and columns.

16. The apparatus of claim 15, wherein the ½ wave plate pattern is a stripe pattern formed in a column direction of the micro lenses at the MLA.

17. The apparatus of claim 15, wherein the ½ wave plate pattern is a stripe pattern formed in a row direction of the micro lenses at the MLA.

* * * * *